Figure 4:
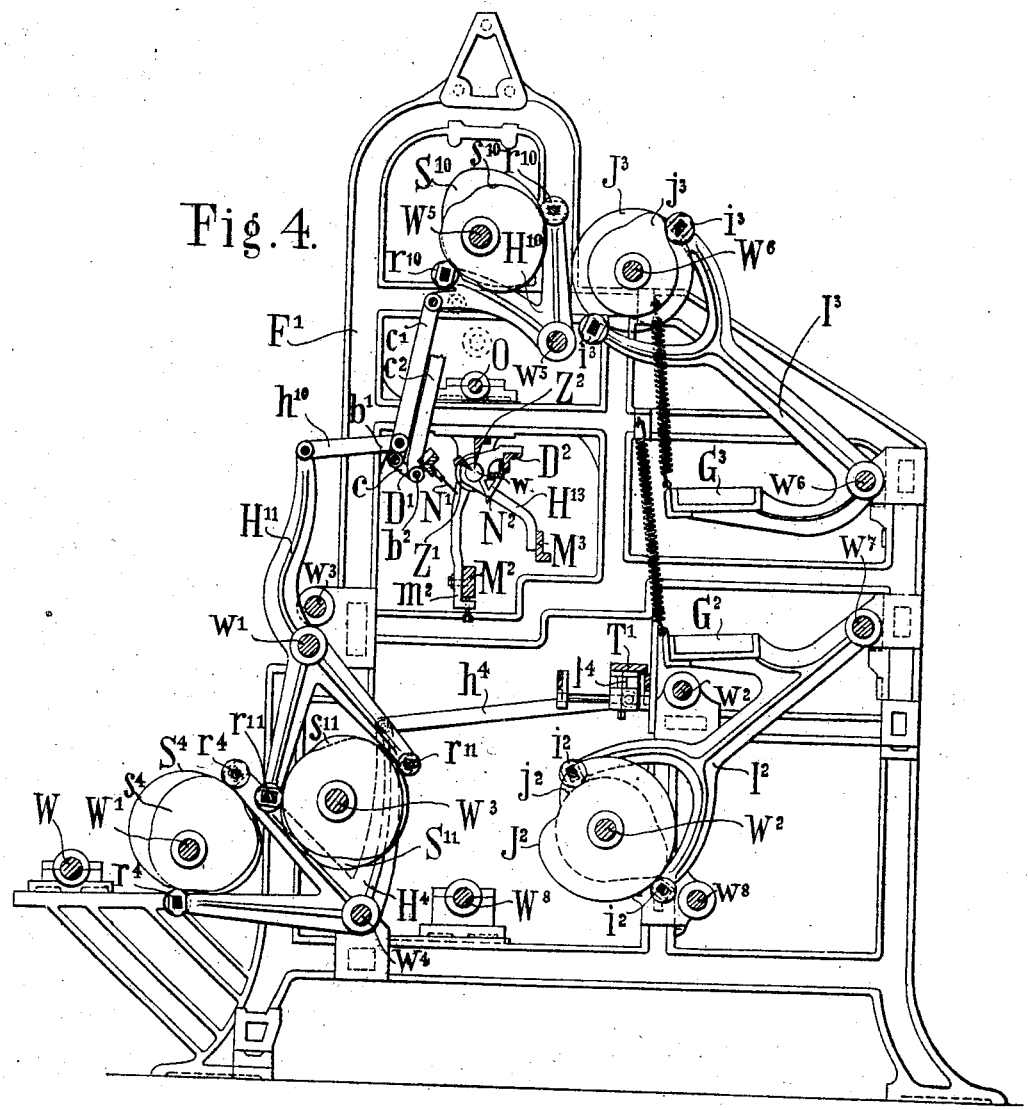

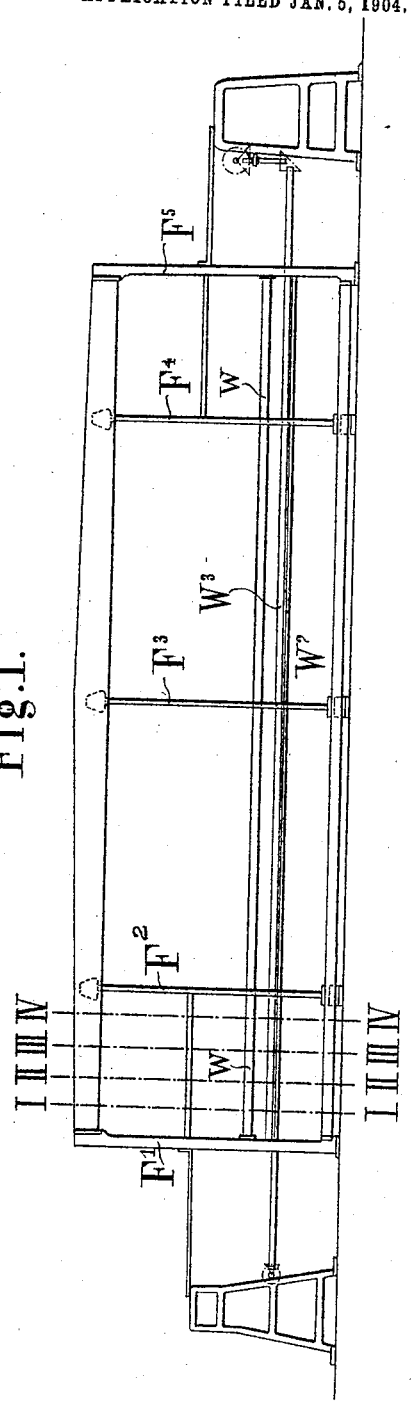

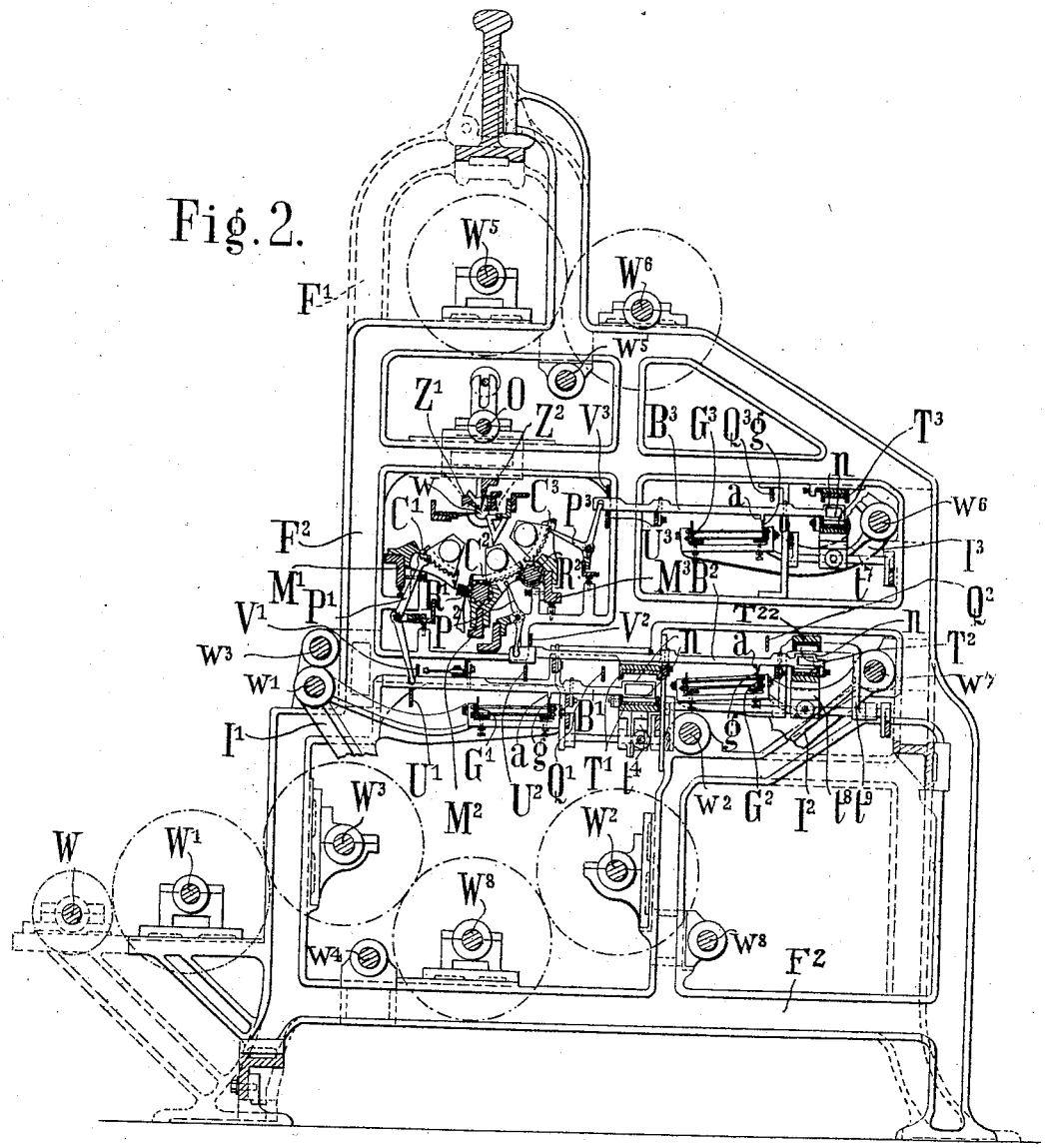

No. 797,067. PATENTED AUG. 15, 1905.
A. MATITSCH.
LACE MAKING MACHINE.
APPLICATION FILED JAN. 5, 1904.
16 SHEETS—SHEET 3.
Fig. 2.ª
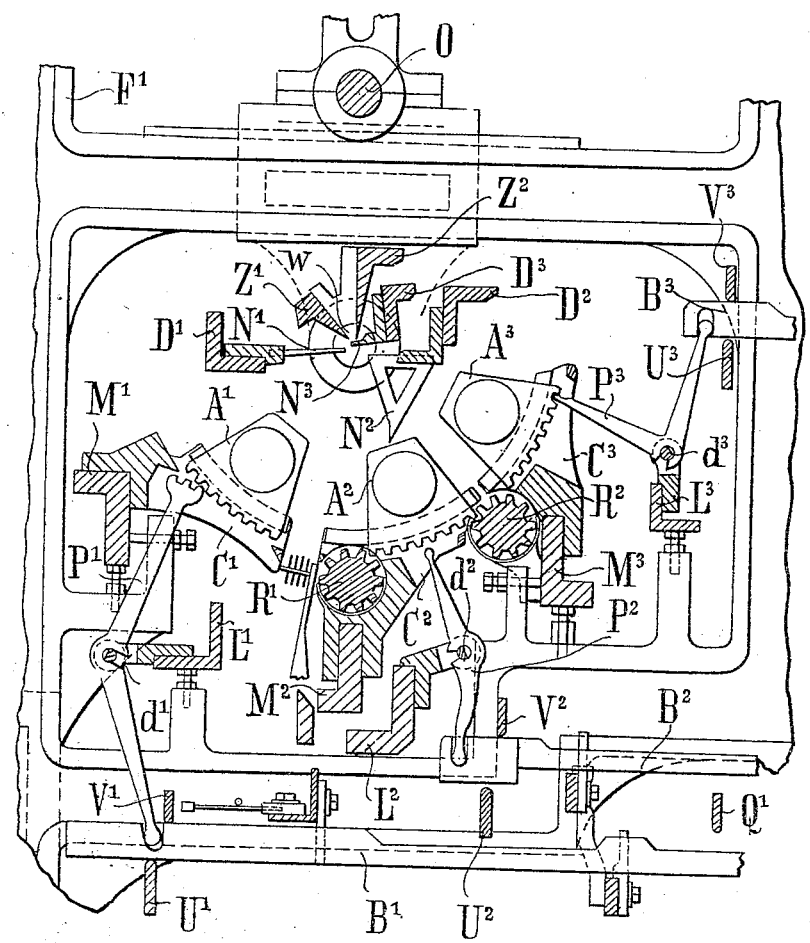

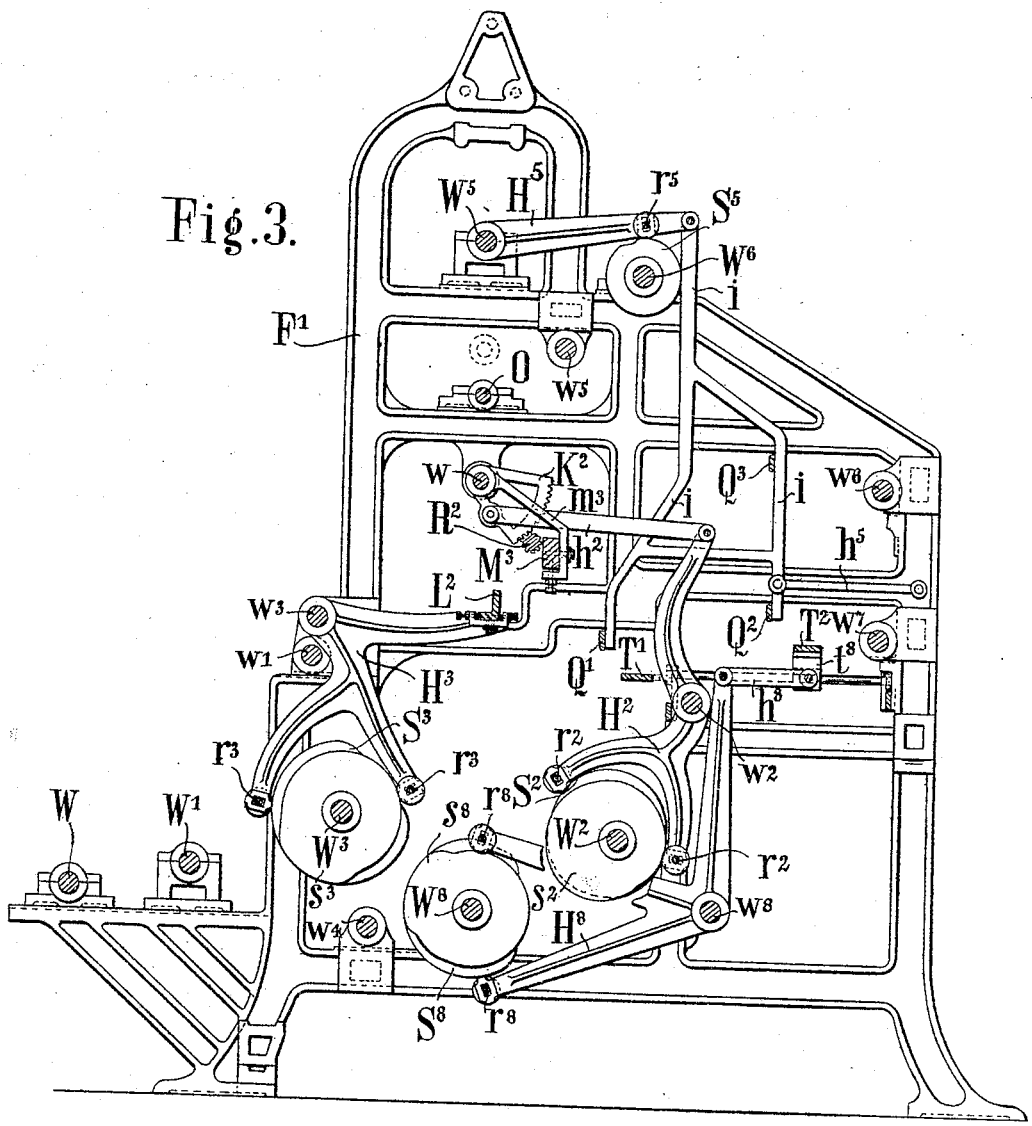

No. 797,067. PATENTED AUG. 15, 1905.
A. MATITSCH.
LACE MAKING MACHINE.
APPLICATION FILED JAN. 5, 1904.

16 SHEETS—SHEET 5.

No. 797,067. PATENTED AUG. 15, 1905.
A. MATITSCH.
LACE MAKING MACHINE.
APPLICATION FILED JAN. 5, 1904.

16 SHEETS—SHEET 8.

No. 797,067. PATENTED AUG. 15, 1905.
A. MATITSCH.
LACE MAKING MACHINE.
APPLICATION FILED JAN. 5, 1904.

16 SHEETS—SHEET 9.

Inventor
August Matitsch
by Henry Orth Jr.
Atty.

Witnesses:

No. 797,067. PATENTED AUG. 15, 1905.
A. MATITSCH.
LACE MAKING MACHINE.
APPLICATION FILED JAN. 5, 1904.

16 SHEETS—SHEET 10.

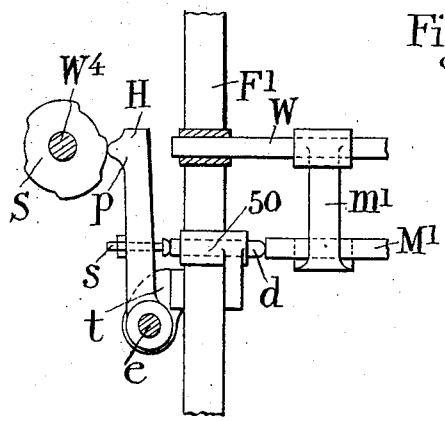
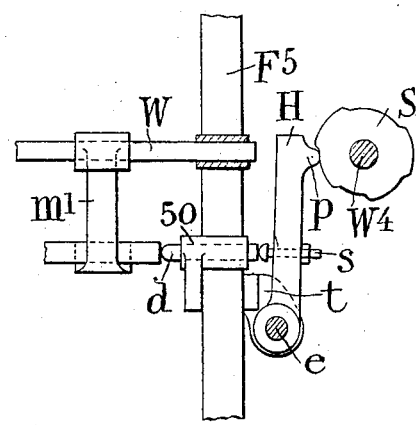
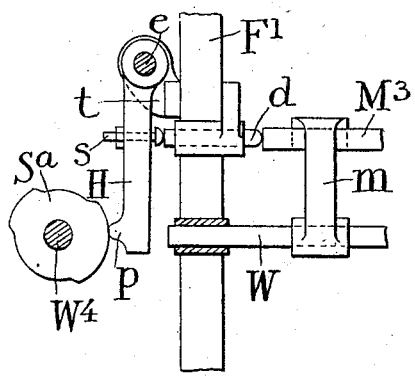
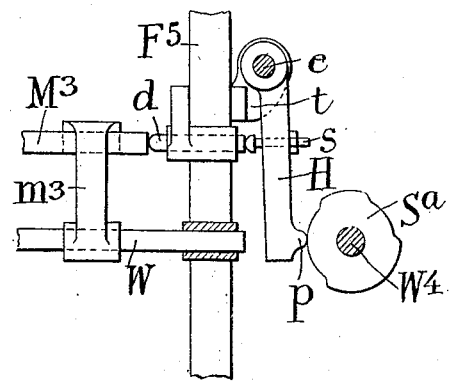
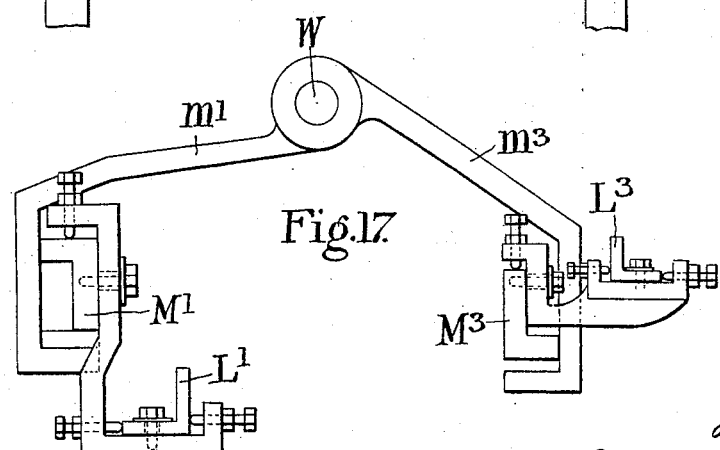

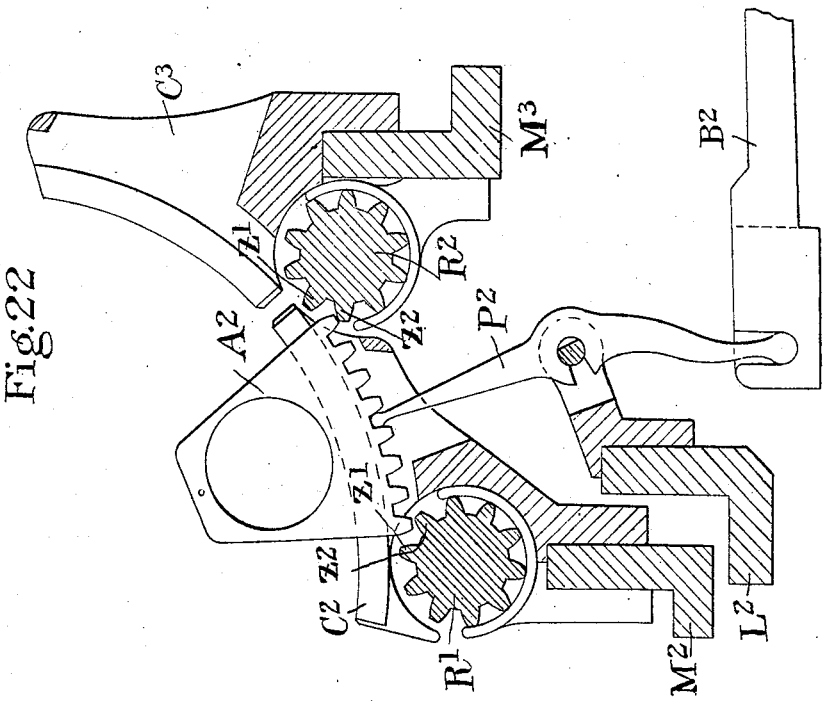
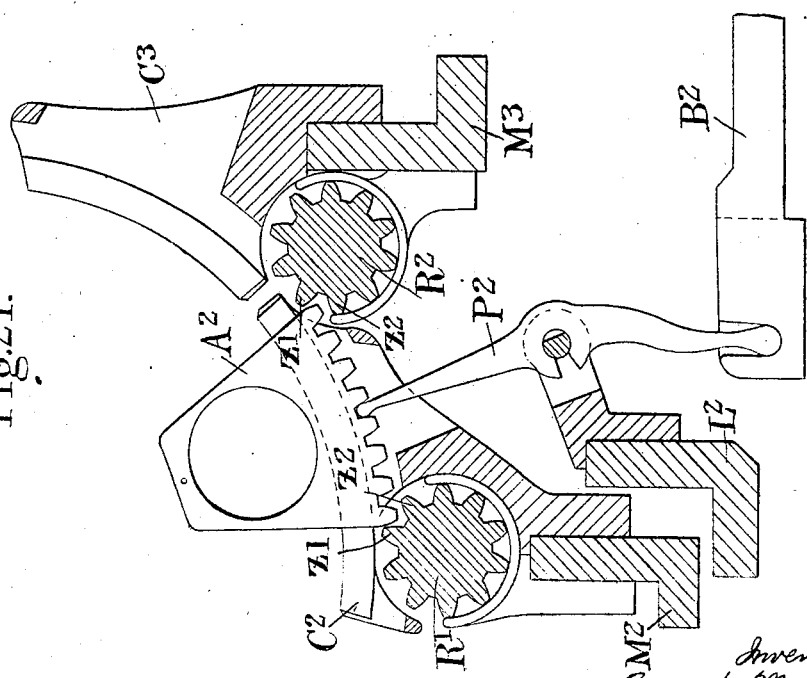

No. 797,067. PATENTED AUG. 15, 1905.
A. MATITSCH.
LACE MAKING MACHINE.
APPLICATION FILED JAN. 5, 1904.
16 SHEETS—SHEET 13.
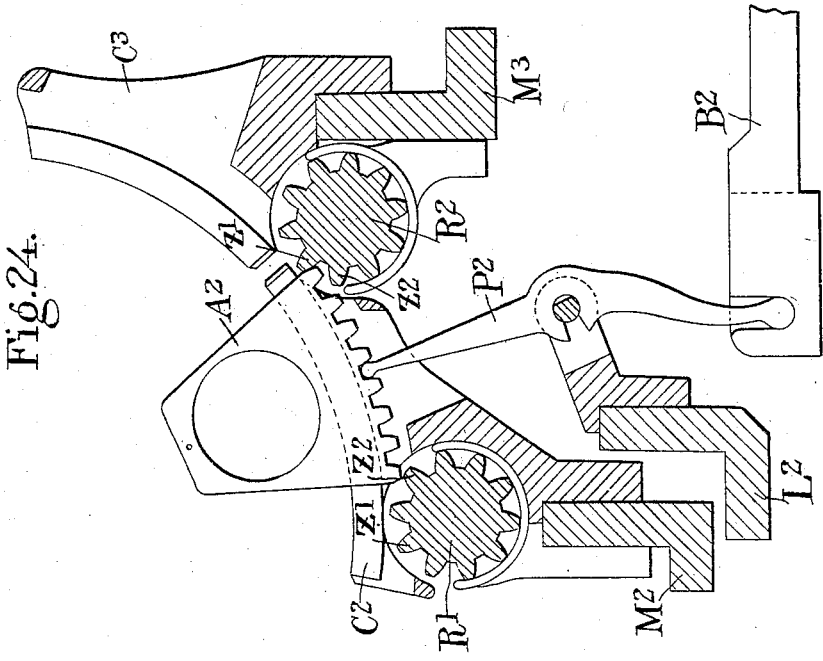
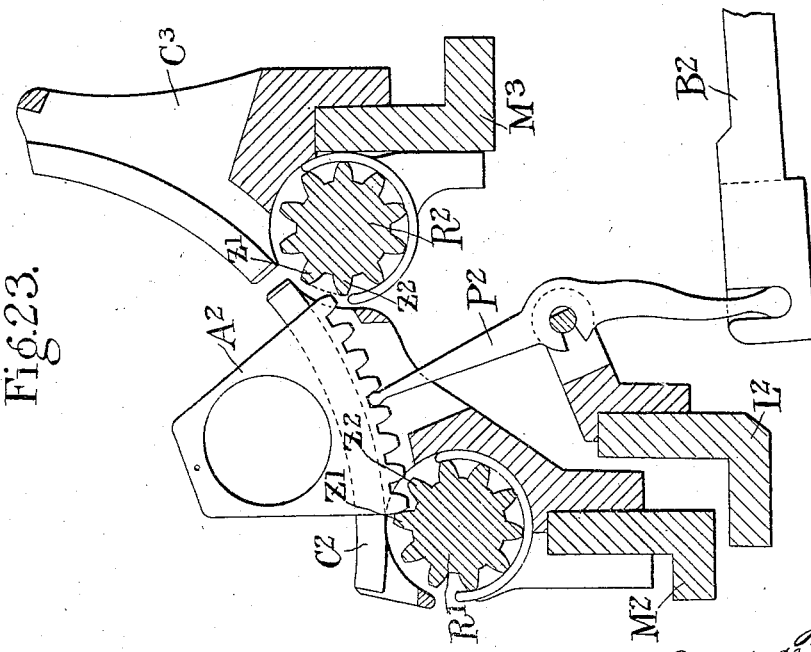

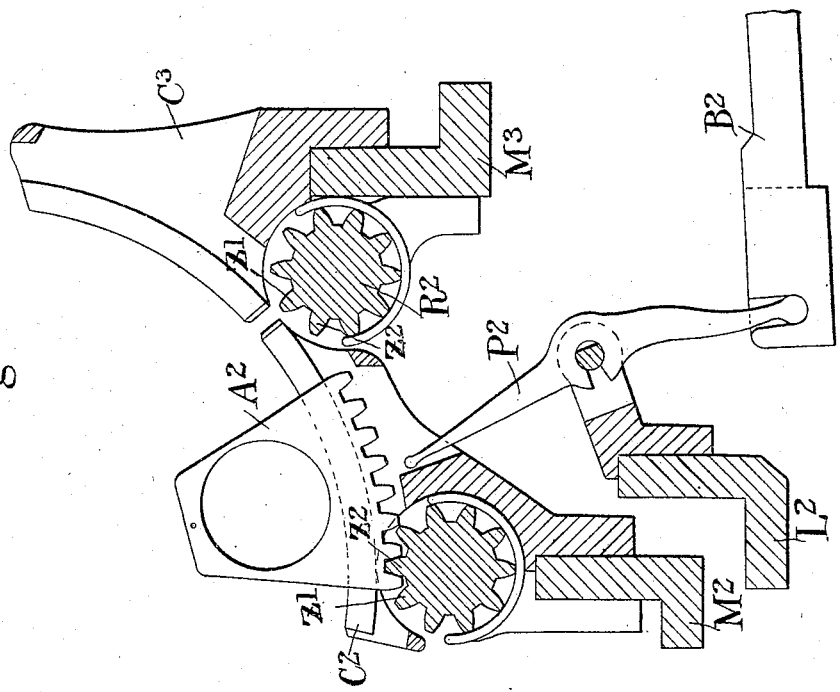
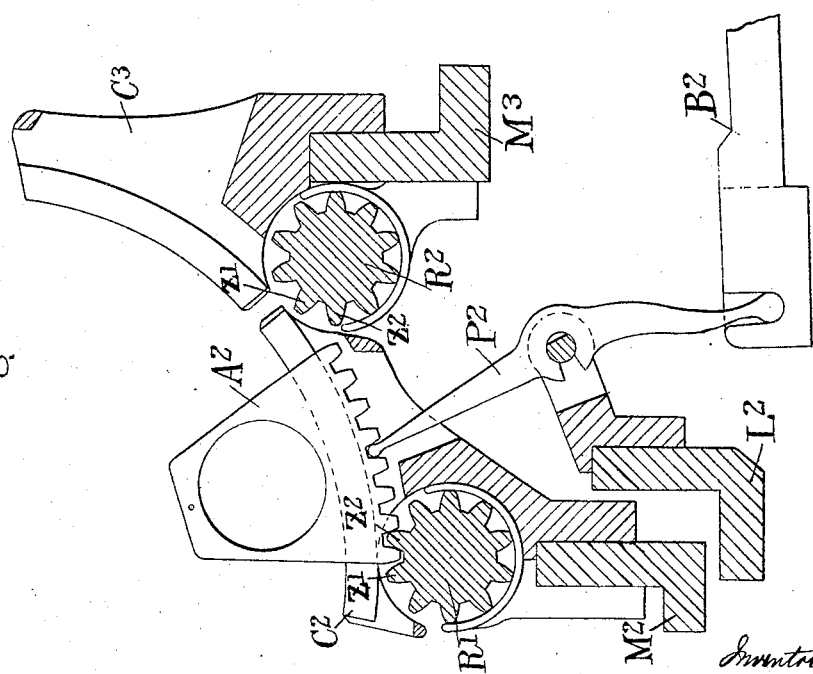

No. 797,067. PATENTED AUG. 15, 1905.
A. MATITSCH.
LACE MAKING MACHINE.
APPLICATION FILED JAN. 5, 1904.
16 SHEETS—SHEET 15.
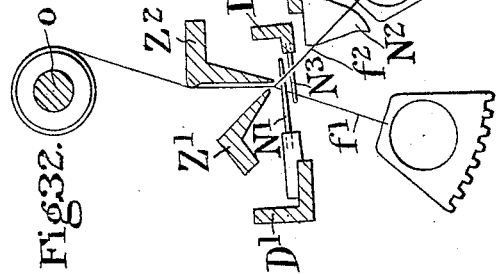
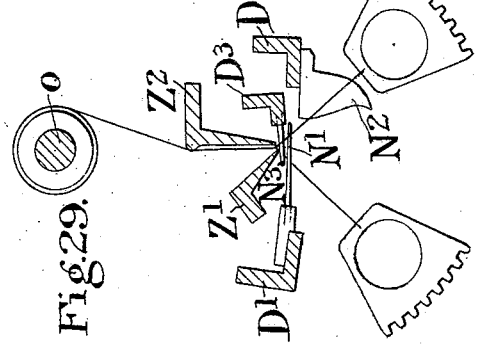
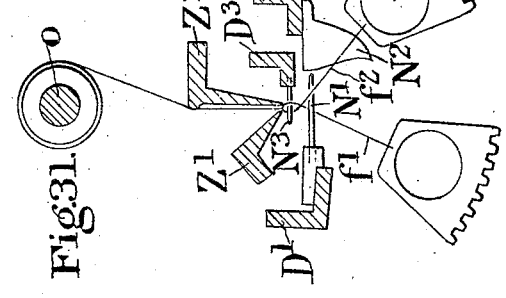
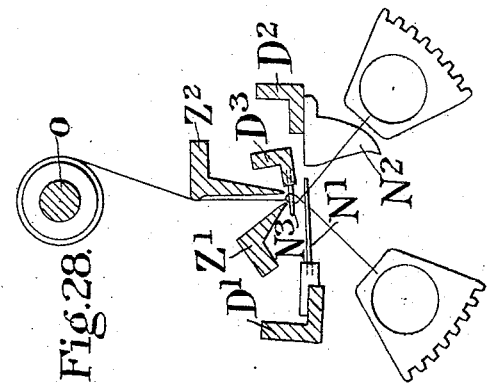
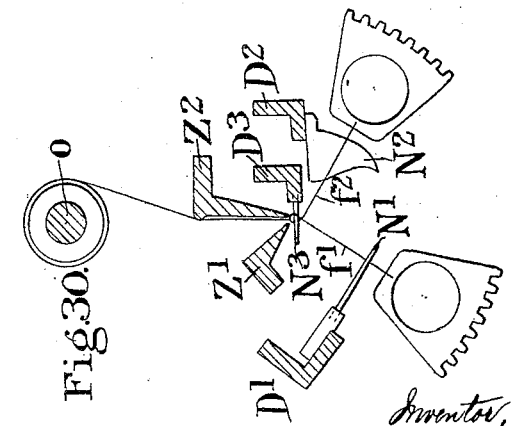
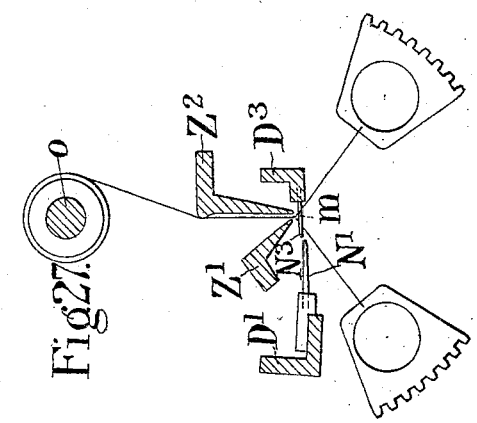

No. 797,067. PATENTED AUG. 15, 1905.
A. MATITSCH.
LACE MAKING MACHINE.
APPLICATION FILED JAN. 5, 1904.

16 SHEETS—SHEET 16.

UNITED STATES PATENT OFFICE.

AUGUST MATITSCH, OF VIENNA, AUSTRIA-HUNGARY.

LACE-MAKING MACHINE.

No. 797,067.    Specification of Letters Patent.    Patented Aug. 15, 1905.

Application filed January 5, 1904. Serial No. 187,810.

*To all whom it may concern:*

Be it known that I, AUGUST MATITSCH, a subject of the Emperor of Austria-Hungary, residing at Vienna, in the Province of Lower Austria, in the Empire of Austria-Hungary, have invented certain new and useful Improvements in Lace-Making Machines; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This invention relates to lace-making machines, and more particularly machines for making pillow-lace of the kind described in the specifications of the following United States Letters Patent: No. 586,136, dated July 13, 1897, and No. 705,539, dated July 22, 1902. In a machine of this kind constructed with the improvements of the present invention driving-rollers are arranged under the middle one of three combs, serving to guide the thread-carriages—namely, one driving-roller under the front end and one under the rear end of this middle comb—said rollers serving to take over from small levers or pickers, also referred to as "pushers," (front and back pickers,) the carriages which have been moved by the said pickers out of the front or rear comb into the middle comb and of moving said carriages into said middle comb without the aid of the pickers, also referred to as "pushers," (middle pickers,) appertaining to the middle comb and keeping it therein until the commencement of the return movement of these carriages into the outer combs, also without the help of the middle pickers, these latter commencing to operate only at the moment when the carriages are to be moved out of the middle comb into the outer comb. Consequently a jacquard apparatus which serves for moving the middle pickers comes into operation only on the return of the carriages into the outer combs—that is to say, it operates only once at each stroke or passage of a carriage from an outer comb, through the middle comb, into another outer comb, just as is the case at present in the jacquard apparatus serving to actuate the front and rear pickers.

By the term "stroke" is meant a completed movement, at which time all of the carriages are in front and rear combs and can be determined by a glance at the machine when it is in operation.

Therefore contrary to the known machines of this kind in which the middle pickers are obliged to commence their operation as soon as the carriages move into the middle comb for the purpose of bringing the carriages into the middle comb and holding them firmly therein, so that the jacquard apparatus of the middle pickers must come into operation twice—viz., once when the carriages move out of the outer combs into the middle comb and again when they return into the outer combs—the machine constructed according to this invention can be driven as fast again, whereby the output is increased almost twofold. At the same time there is obtained the further advantage that the cost of the jacquard-cards is reduced for each design, because in consequence of the fact that the jacquard apparatus of the middle pickers comes into operation only once at each stroke of the machine the number of the cards required for the said jacquard apparatus is reduced by one-half.

Further, the present invention has for its object to dispense with the independently-actuated lifting-needles with their accurately-finished and complicated actuating mechanisms and their two jacquards employed in machines constructed in accordance with the above-mentioned United States Letters Patent No. 705,539, and to this end the improvements according to the present invention consists in the arrangement of a needle-bar having a set of lifting-needles which are actuated together and uniformly. By this means the following economical advantages are obtained—viz., first, considerable diminution in the cost of manufacture of the machine; second, diminution of the continually-recurring outlay for drawing the patterns and for the pattern-cards. By thus dispensing with the mechanisms for actuating the mutually independent lifting-needles and two jacquards the construction of the machine is considerably simplified, and by reducing the requisite jacquards from six to four also the outlay for drawing the patterns and for the pattern-cards is diminished in a proportionate degree.

A machine constructed in accordance with the present invention is illustrated diagrammatically in the accompanying drawings, in which—

Figure 7:
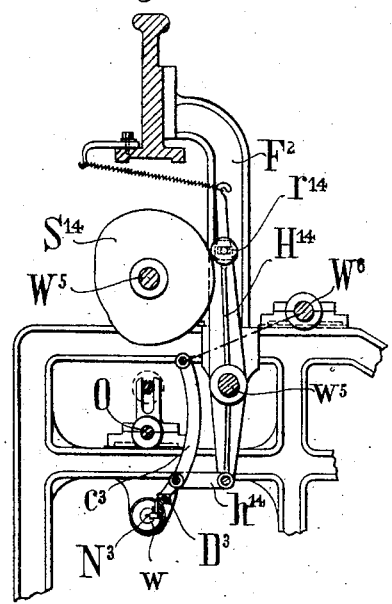
Figure 8:
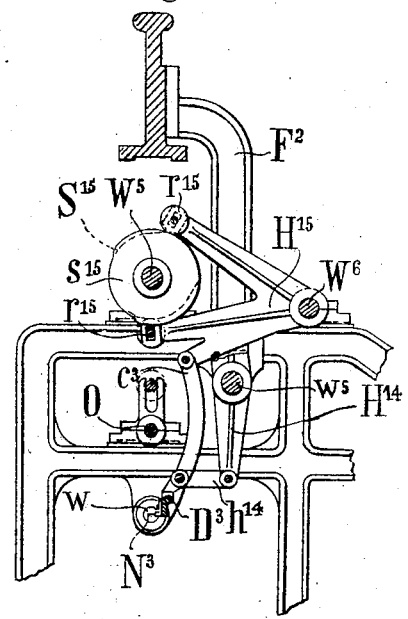
Figure 16:
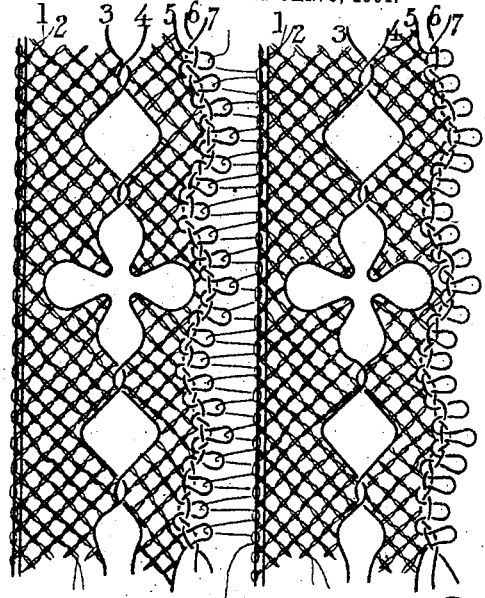
Figure 33:
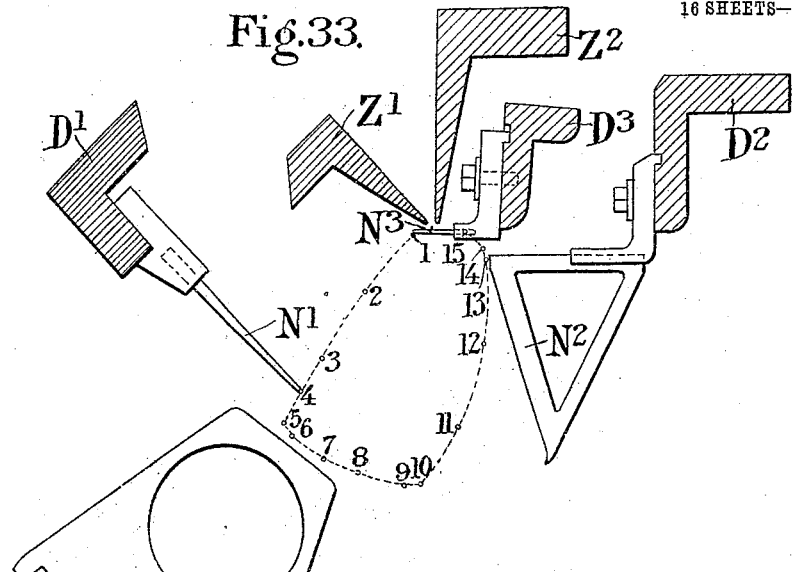
Figure 34:
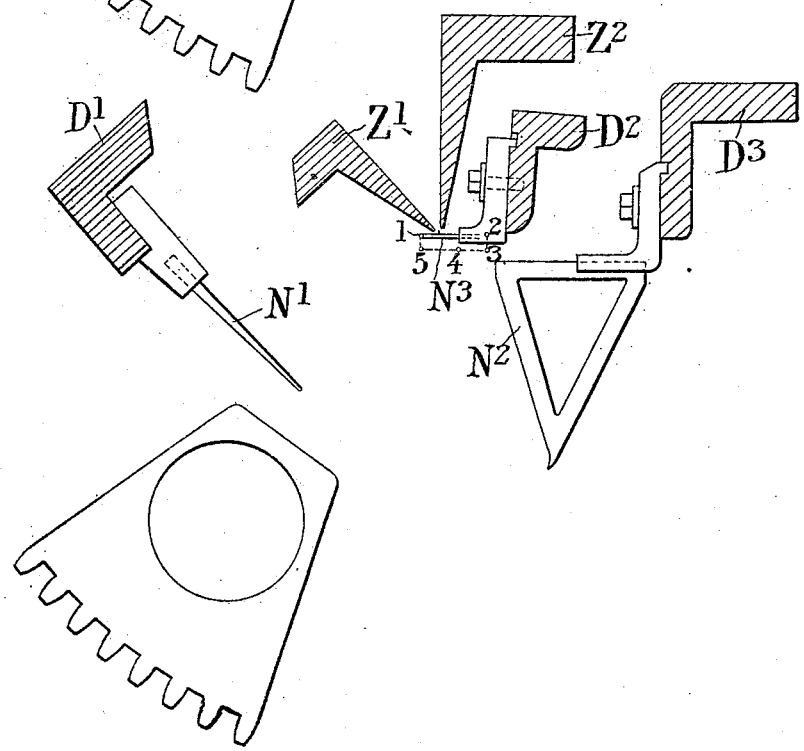

Figure 1 illustrates the framing of the machine and of the jacquard apparatuses connected therewith. Fig. 2 is a vertical cross-section through the middle of the machine, showing its essential parts, which are shown again on a larger scale in Fig. $2^a$. Figs. 3, 4, 5, and 6 are vertical cross-sections on the lines I I, II II, and III III, and IV IV of Fig. 1, showing the supports for the carriages, as also the mechanism (composed of cams, levers, rollers, and bars) serving to actuate the same. Figs. 7 and 8 are separate views of the devices for actuating the lifting-needles. Figs. 9 to 15 illustrate the movements of the needles. Fig. 16 shows two strips simultaneously made by this machine. Figs. 17, 18, and 19 show the mechanisms to move the front and rear combs longitudinally. Figs. 20, 21, 22, 23, 24, 25, and 26 illustrate, on a larger scale, the coöperation with the rollers and carriages of the middle pickers. Figs. 27, 28, 29, 30, 31, and 32 illustrate successive positions of the needles. Figs. 33 and 34 illustrate the path of movement of the needles during a stroke.

The framing of the machine consists, as shown in Fig. 1, of the uprights $F'$ $F^2$ $F^3$ $F^4$ $F^5$. Between the uprights $F'$ and $F^2$ and also between $F^4$ and $F^5$ there are arranged the cams and levers for actuating the carriages, and between the uprights $F^2$ $F^3$ and $F^3$ $F^4$ there are arranged the threads that are carried by the carriages and beams and the lace which is made from the said threads. Externally to the uprights $F'$ and $F^5$ the two jacquard apparatuses are arranged in separate frames, the left-hand jacquard being an underpick jacquard driven by a shaft $W^2$, while the other or right hand is an overpick jacquard and is driven by a shaft $W^3$, motion being derived from the main driving-shaft W, Fig. 2, through suitable toothed gearing.

The left-hand jacquard serves to actuate laterally the hereinafter-described lifting-bars, and the right-hand jacquard serves to operate thread-bars and has, therefore, the same functions as in "English" lace-making machines.

The machine produces a great number of strips of lace arranged side by side at one and the same time and is so constructed that the design is repeated in regular succession after a determined number or set of comb-slots. In each set of comb-slots the threads of the same class having the same place-numbers, as well as the carriages and bars appertaining to said threads, must make the same movements, and therefore in all the sets of comb-slots, the pickers, their plates, and lifting-bars of the same class and the same place-number must move in exactly the same manner—that is to say, the thread marked No. 1 in the first set, as well as its actuating mechanism, must make the same movements as the threads marked No. 1 in all the other sets. This is also the case with all the threads marked No. 2, &c.

Figure 5:
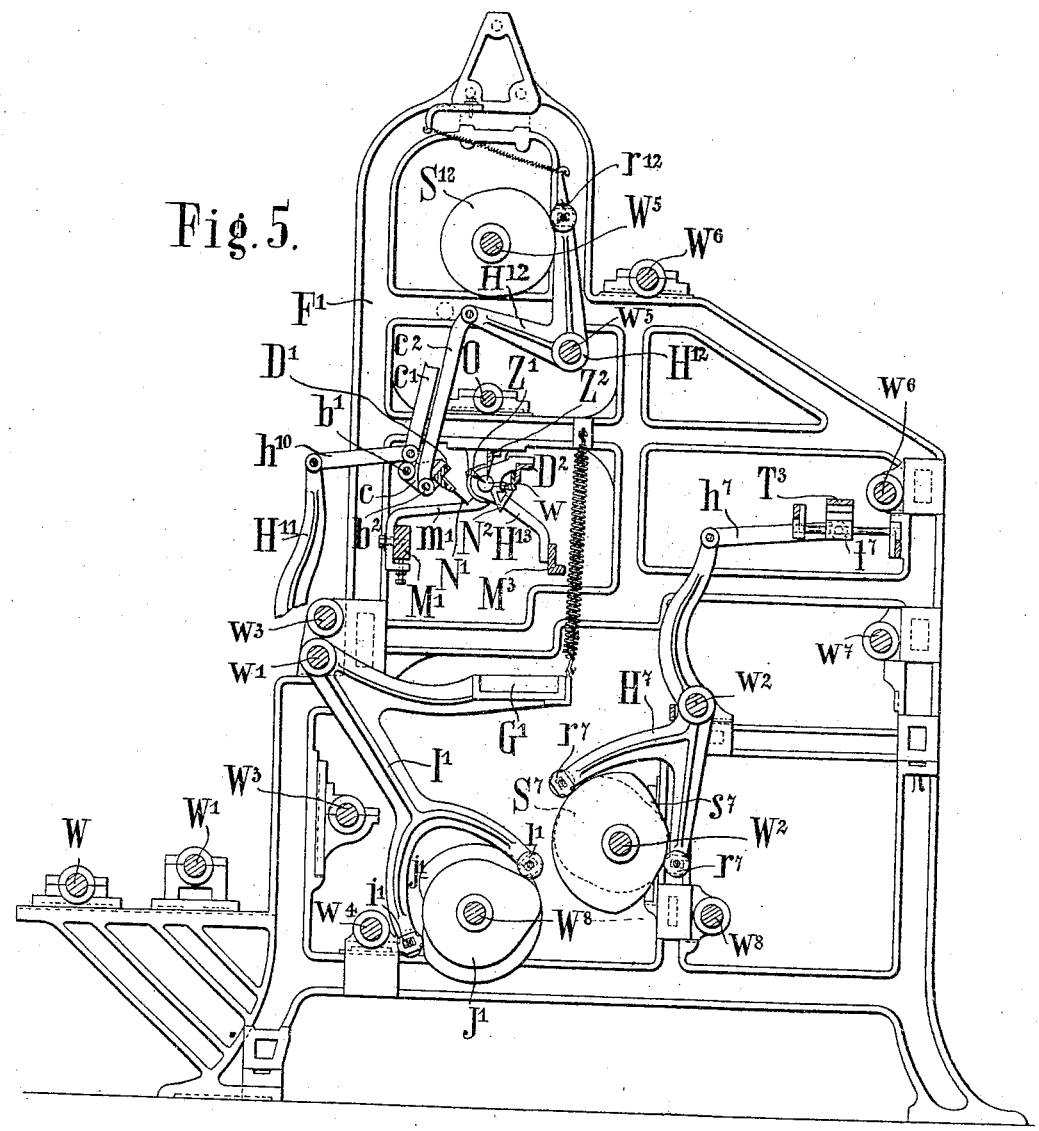

On referring to Fig. 2 it will be seen that the three combs (the front comb $C'$, the middle comb $C^2$, and the rear comb $C^3$) are fixed to their comb-bars $M'$ or $M^2$ $M^3$, which serve as their supports and which are carried by arms $m'$, Fig. 5, $m^2$, Fig. 4, $m^3$, Fig. 3, of which the first and the last mentioned may be moved on the axle $w$ in the direction of the length of the machine, so that also the corresponding comb-bars and combs are capable of being moved to the left and to the right of the operator. The middle-comb bar is prevented from lateral movement by two set-screws, and therefore the middle comb is thus rendered immovable. The comb-bars $M'$ $M^2$ $M^3$ for the purpose of exact adjustment of their combs are by means of set-screws made capable of being moved up and down on the arms $m'$ $m^2$ $m^3$ and of being fixed thereon by means of clamping-screws.

Driving or toothed rollers $R'$ or $R^2$ are arranged under the front and rear end of the middle comb $C^2$. Their teeth engage with toothed arcs on the carriages which have been moved close to them, so that the said carriages when the driving-rollers are rotating may be engaged by these and moved forward or backward in the combs. By the rotation of the front driving-roller $R'$ in one direction the carriages which have engaged by it are moved out of the front comb, and by the rotation of the rear driving-roller $R^2$ in the opposite direction the carriages which have been engaged by it are moved out of the rear comb into the middle comb—that is to say, into the middle position between the two driving-rollers—in which they are prevented from being carried beyond the projecting teeth of the latter from moving backward or forward.

Figure 6:
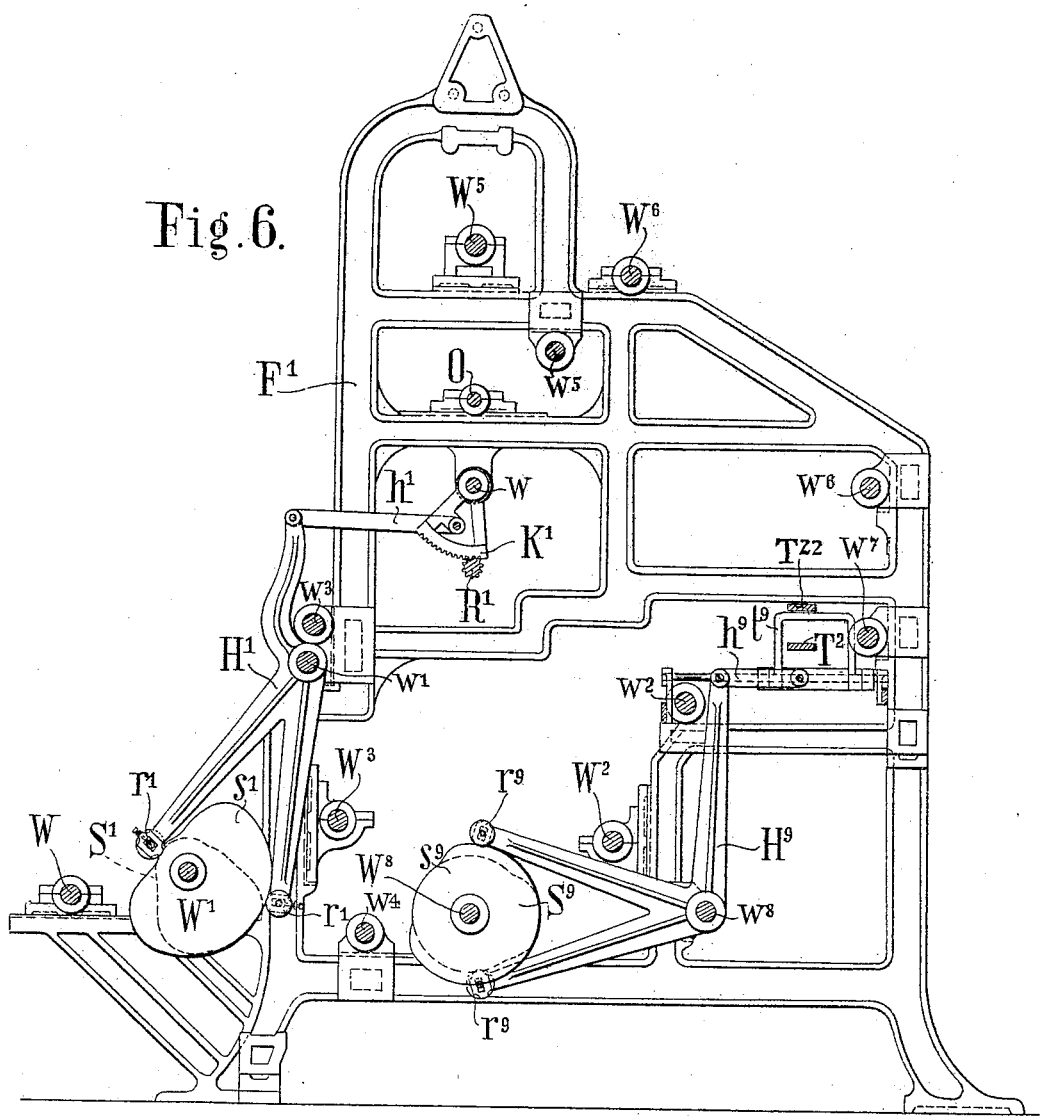

The front driving-roller $R'$ receives its motion by means of two cams $S'$ $s'$, Fig. 6, mounted on the shaft $W'$ and acting upon the antifriction-rollers $r'$ $r'$, which are mounted on the two arms of a three-armed lever $H'$, fitted loosely on the axle $w'$. The third arm of this lever is connected by a rod $h'$ with a toothed arc $K'$, mounted loose on the axle $w$ and engaging with the roller $R'$. The rear roller $R^2$, as will be seen from Fig. 3, is actuated by cams $S^2$ $s^2$, keyed on the shaft $W^2$. These cams act upon antifriction-rollers $r^2$ $r^2$, which are mounted so as to rotate on two arms of a three-armed lever $H^2$. The latter is mounted loose on the axle $w^2$, and its third arm is connected, by means of a rod $h^2$, with a toothed arc $K^2$, which is mounted loose on the axle $w$ in the same manner as the toothed arc $K'$ and engages with the driving-roller $K^2$.

At the commencement of the working a series of carriages are situated in the front comb $C'$ and a second series are situated in the rear comb $C^3$. No carriages are situated in the middle comb $C^2$. The carriages which are moved during one stroke from an outer comb $C'$ or $C^3$ into the other outer comb, or those carriages which have to alter their positions in the same comb, are moved simultaneously from the front comb $C'$ and from the rear comb $C^3$ into the middle comb $C^2$, while the carriages which must not be moved are kept back in the outer combs $C'$ $C^3$. The movement of the carriages from the middle comb into the front and rear combs also takes place thereafter and simultaneously and in such a manner that during each of these movements all of the carriages are moved out of the middle comb at one and the same time.

All carriages that at the beginning and end of a stroke are to assume positions in the outer combs must be held in their respective combs by the corresponding pickers.

As the number of the carriages held in the respective combs may differ at every stroke, the selection of the carriages to be held must be made by a selector mechanism or jacquard that selectively positions the pickers so that certain ones are rendered immovable during a stroke, and consequently hold the carriages in the outer combs likewise immovable during this stroke. Consequently a selection must be made among the carriages in the outer combs before moving the carriages into the middle comb; but the selection of the carriages in the middle comb must be made only just before the return of the carriages situated therein into the outer combs.

The transfer of carriages from the outer combs into the middle comb is effected in this machine by the rollers only and without the aid of the middle pickers, which latter move the carriages into engagement with the rollers. Of the carriages that have been brought into the middle comb some are to be transferred to the front comb and the rest to the rear comb. Which carriages are to be transferred to the front and which to the rear comb depends upon the design of the lace to be made. During every stroke there are other carriages or a different number of carriages in the middle comb, and consequently they must be selected into two general sets before the beginning of their movement out of the middle comb, one general set to go to the front comb and the other to the rear comb, and this is done by a jacquard mechanism that selectively moves the general groups into proper engagement with their respective rollers through the medium of the middle pickers. This is effected by means of small levers or pickers $P'$ $P^2$ $P^3$, Fig. $2^a$, which are adapted to rotate independently of one another on axles $d'$ $d^2$ $d^3$ and the upper ends of which project each into a comb-slot. They are designated as "front," "middle," or "rear" pickers, according to the comb to which they belong. In the rotation of the picker its end situated in the comb-slot engages in the tooth-spaces of the toothed arc of the carriage situated above the picker. The carriages which are engaged by the pickers are consequently held in determined positions so long as the pickers are not moved; but the said carriages are moved in the combs when the pickers are moved.

The front pickers $P'$ are constructed at their upwardly-projecting ends as small toothed arcs, by means of which they can engage in the toothed arcs of the corresponding carriage. The middle pickers and the rear pickers have rounded upper ends, with which they can engage in a tooth-space of the toothed arcs of the carriages. The middle pickers $P^2$ are normally out of engagement with the carriages and can only act when they are moved from their idle position between the two driving-rollers toward the middle comb. By suitable rotation these middle pickers then transfer the carriages engaged by them to the front or to the rear roller. The mechanism for rotating the middle pickers is described farther on in the specification.

The axles $d'$ $d^2$ $d^3$, on which the pickers $P'$ $P^2$ $P^3$ rotate, are carried by bars $L'$ $L^2$ $L^3$, Fig. $2^a$, of which the first is rigidly connected to the front-comb bar $M'$ and the last to the rear-comb bar $M^3$. In consequence of this connection the axles $d'$ $d^3$, together with the pickers $P'$ or $P^3$, are moved at one and the same time and in the same manner as the front or rear comb in the direction of the length of the machine. This is necessary in order that the ends of the pickers situated in the comb-slots shall not be subjected to an injurious lateral pressure in these slots when the comb is moved. Fig. 17 shows the end mounting of the front and rear comb and picker bars. Figs. 18 and 19 are plan views, partly in section, showing how longitudinal motion is imparted to the front and rear comb bars $M'$ and $M^3$, that carry their respective picker-bars $L'$ and $L^3$. In Fig. 18 is shown the two outer frames $F'$ and $F^5$, with shaft $w$, that carries arms $m$ and $m^3$. On each of the frames or standards $F'$ and $F^5$ is secured a bracket $t$, having a pin $e$, on which is loosely mounted a lever H, having an adjustable contact-stud $s$ and a nose $p$. The stud engages a pin $d$, slidably mounted in a bearing or sleeve 50, forming part of bracket $t$, and the noses $p$ engage cams S, the right-hand one being complementary to the left-hand cam, so that the amount of motion will always be the same and independent and uninfluenced by the inertia of the moving parts, especially of the bars moved. Each cam is mounted on a vertical shaft $W^4$ at each side of the machine and driven by bevel-gear from shaft $W^8$. (Not shown and analogous to that shown in Fig. 8 of Patent No. 705,539.) In Fig. 19 are shown cams $S^a$, complementary to one another, also mounted upon the shaft $W^4$ and actuating mechanisms in every respect similar to Fig. 18 for moving the rear-comb bar $M^3$. The cams make one revolution for every three steps, differing in radii for three degrees of movement, while the cams for the rear comb have only two steps differing in radii. As the middle comb is stationary, the middle pickers and their bar $L^2$ must not have any lateral movement; but this bar must be capable of being raised or lowered for the purpose of enabling the upwardly-projecting end of the middle pickers to be set at certain times higher or lower in the slots of the middle comb, and thereby to be brought into or out of engagement with the arcs of the carriages. For this purpose the bar is carried by one arm of the three-armed lever $H^3$, Fig. 3, which is fixed on an axle $w^3$ and is positively actuated by the cams $S^3 s^3$, mounted on the shaft $W^3$, these cams transmitting motion to antifriction-rollers $r^3 r^3$ on the other two arms of the lever $H^3$. By the raising of the bar $L^2$, which is thus effected, the ends of the pickers are caused to engage with the tooth-spaces of the carriages which happen to be situated above them in the middle comb, while by the depression of the bar they are depressed to such an extent that the carriages can be pushed without hindrance forward or backward in the middle comb by means of the roller.

The raising of the bar $L^2$ must take place at every stroke after the carriages which have been transferred from the outer combs into the middle comb have been moved into the middle position and are held therein between the rollers by the latter. The middle pickers thus raised then move the carriages into the path of the front or rear roller (according to the rotation of said pickers) which also commence to rotate with the middle pickers toward the front or rear comb.

Figure 20:
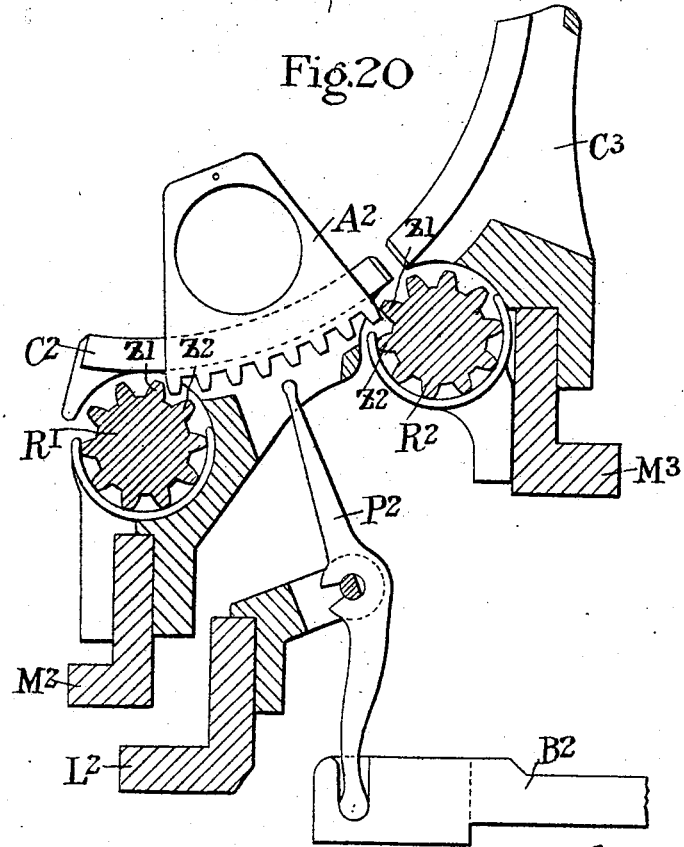

Fig. 20 shows the two oscillating rollers $R'$ and $R^2$ at that moment when they hold a carriage $A^2$ between their teeth, as $z'$, in order to enable the end of middle picker $P^2$ to be accurately moved into the space between two of the teeth of a carriage, being the same position of the parts as shown in Fig. $2^a$. Fig. 21 shows the next position of these parts in which the middle picker-bar $L^2$ has been raised, so that the picker holds the carriage, which can be made to be engaged by either of the rollers on their reverse movement. The rollers then move, as shown in Fig. 22, so that the teeth $z'$ move away from the carriage slightly and leave the carriage free, while the next following tooth $z^2$ of each roller is in such a position that the carriage can be moved just over it in either direction. While the rollers are making this movement the pickers hold the carriages fast in their middle position, and then follows a pause in the movement of the rollers, while the picker having first been selected by its jacquard is moved. This movement (for example, the forward movement) sends the rear tooth of the carriage out of range of tooth $z^2$ of the rear roller and the forward tooth of the carriage against the tooth $z'$, Fig. 23.

In Fig. 24 the rearward movement of a carriage is shown. The end tooth of the carriage is now between the teeth $z'$ and $z^2$ of the roller; but since the tooth $z^2$ does not immediately engage the end tooth of the carriage the picker must make a still further forward movement until tooth $z^2$ takes a firm hold, Fig. 25, after which the picker-bar $L^2$ is lowered quickly to permit the roller to complete the movement of the carriage, Fig. 26. As soon as in consequence of this rotation a tooth of the roller has moved between two teeth on the carriage and the said carriage is thus securely engaged by the roller the bar $L^2$ is moved down into its lowest position, so that the end of the picker comes out of contact with the carriage, and the latter being no longer hindered by the middle picker can be moved farther on by the roller.

To each picker there is pivoted a thin plate $B' B^2 B^3$, by means of which the pickers are held in determined positions or are rotated on their axes $d' d^2 d^3$. The front and rear picker-plates $B' B^3$ have for object to keep the pickers $P' P^3$ (which are pivoted to them and which have to keep the carriages out of operation) firmly in the foremost position in the front comb or in the rearmost position in the rear comb and to rotate the pickers that are in motion first toward the front roller or rear roller and then after having suitably held them fast to return them again into the foremost or rearmost position.

All the middle pickers $P^2$ are in motion at each stroke—namely, a portion thereof are rotated by means of the picker-plates $B^2$ out of the middle position toward the rear roller $R^2$, while the others are rotated at the same time to the front roller $R'$, whereupon the middle pickers are moved again and back at the same time into the middle position.

The front ends of the picker-plates are connected to these ends of the pickers, which do not enter the tooth-spaces of the carriages, in such a manner that the rear ends of the said plates are able to describe a limited arc-shaped movement in a vertical sense around these picker ends. By this means lugs $n$ on these ends of the plate, which project upwardly and downwardly, move, according to the position of the plates, into the path of different bars and are held by the latter either in determined positions or are moved forward or backward. These bars $T' T^2 T^3$, which are provided, as hereinafter described, one pair for each group of plates $B'$ or $B^2 B^3$, are of channel shape in cross-section and have their flanges directed toward the lugs of the plates nearest to them, each such bar being capable of receiving between its flanges the similarly-situated lugs of the corresponding plates, so that the plates when they have been moved with their lugs between the flanges of these bars are only able to move together with said bars. The raised front and rear plates B' and B³ are held fast by these bars in their rear end position; but the plates which are not raised are pushed out of this position forward, and thereby the pickers connected to them are rotated toward the middle comb C². The raised front and rear plates B' and B³ are held fast by the bars T' and T³, situated above the plates, when in their rear end position, while those plates that are not raised are pushed out of their rear end position by the lower sliding portions of the bars T' and T³, lying below the plates B' and B³, as soon as the lugs of these plates engage between the flanges of these movable channel-shaped bars. In the subsequent opposite movement of these bars T' T³ the corresponding plates and the pickers P' P³, connected to them, return to their original position.

The middle plates B² may be brought into three different positions, because they can be moved out of the middle position rearwardly into a rear end position and from the latter back again into the middle position or from this position into a forward end position and back into the middle position. The arrangement in this respect is such that one of the two bars T² moves forward the plates B² that were not raised, and thereby rotates the connected middle pickers P² out of their middle position toward the rear comb, while the other bar T²² moves the raised plates B² out of the middle position to the rear, and thereby sets the corresponding middle pickers for the front comb. On the reversed movement of these bars the pickers P² move back into their middle position.

Downward movement of the front ends of the picker-plates, which would be liable to bring these plates out of connection with the removably-connected pickers, is prevented during these movements by means of stationary bars U' U² U³. The upper edges of these bars serve also as pivots for the picker-plates B' B² B³ in their upward movement, and the stationary bars V' V² V³ are arranged opposite to these upper edges and directly over the picker-plates, with the object of insuring the said rotation, because the result of this arrangement is to compel the plates to bear constantly upon the aforesaid upper edges of the bars.

The upward rotation of the rear ends of the plates at the commencement of each fresh stroke for the purpose of moving the plates into the path of determined bars T' T²² T³ is effected by means of groups of lifting-bars G' G² G³, which act, by means of shoulders $g$, upon projections $a$, provided on the lower edge of the plates when these plates are to be rotated upward. For this purpose a movement of the lifting-bars is necessary in order to bring their shoulders $g$ under the projections $a$ of the plates. It is also necessary to raise the lifting-bars. This raising of the lifting-bars G' G² G³ is produced by means of the forked levers I' I² I³, Figs. 4 and 5, which are rotatable on the axes $w'$ $w^7$ $w^6$ and whose arms (carrying antifriction-rollers $i'$ $i''$ $i^2$ $i^3$ $i^3$) are actuated by cams J' $j''$ J² $j^2$ J³ $j^3$, keyed on the shafts W⁸ W² W⁶. This raising movement takes place only to such an extent that the corresponding picker-plate is raised thereby only when two projections $a$ and $g$ are situated exactly opposite to each other.

Before the lifting-bars are raised they are set by means of the underpick jacquard apparatus connected with them in accordance with the jacquard-card in such a manner that at all places where a picker-plate is not to be raised the corresponding projection $g$ of the lifting-bar is moved away from the projection $a$ of the corresponding picker-plate, so that, therefore, the ascending lifting-bar does not lift the plate in this case. The lifting-bar has therefore to make two movements—namely, one movement in the direction of its length and one movement up and down. This latter movement takes place always simultaneously and similarly for all the lifting-bars of one class.

Now since there is always only one portion of the picker-plates to be lifted at each stroke and, moreover, different plates at different strokes therefore the lifting-bars which have to effect this lifting must be selected independently of one another, and this renders the employment of a jacquard apparatus necessary. The lifting-bars are for this purpose connected with an underpick jacquard, which effects the movement of the selected lifting-bars parallel to the direction of the length of the machine. Each jacquard-needle is connected to one lifting-bar, and the lifting-bars of each group G' G² G³ are connected to a separate jacquard.

As each jacquard-needle can be set in operation independently of the others, so, also, the picker-plates B' B² B³, which are connected to the jacquard-needles by means of the lifting-bars, can be left in their lower position or can be raised, as desired.

The holding back of the carriages in the front comb is determined by the jacquard which shifts the front lifting-bars G', and the holding back of the carriages in the rear comb is effected by the jacquard which moves the rear lifting-bars G³.

The jacquard which is provided for the middle lifting-bars G² determines those carriages which are to be moved out of the middle comb into the front-comb and also the carriages which are to be moved out of the middle comb into the rear comb. These three jacquards are arranged in the jacquard-frame shown on the left-hand in Fig. 1.

The lifting-bars of the jacquards for the front and rear comb pickers come into operation at once at the commencement of a stroke; but the lifting-bars $G^2$ of the jacquard apparatus for the plates of the middle pickers $P^2$ come into operation only at the commencement of the second half of the stroke after the carriages have been moved by the rollers $R'$ $R^2$ into the middle position.

For the purpose of keeping back a carriage $A'$, Fig. 2, in the front comb in its extreme forward position the corresponding picker-plate $B'$ must be raised by means of the corresponding lifting-bar $G'$ after the latter has been set to make its stroke by means of its jacquard, so that the upper lug $n$ of the plate comes to the same height as the stationary upper bar $T'$, so that the plate is prevented by this bar from moving forward.

In order to move a carriage $A'$ out of its extreme forward position to the middle comb, the corresponding picker-plate $B'$ must not be raised in order that the lower lug $n$ shall remain between the upwardly-projecting flanges of the lower movable bar $T'$, and thereby move the plate in a forward direction, so that the front picker $P'$, connected thereto and by means of this latter also the carriage $A'$, held by it, shall be moved backward to the middle comb. This movement of the bar $T'$ is effected, as shown in Fig. 4, by means of a three-armed lever $H^4$, which is pivoted on the axle $W^4$ and one arm of which is connected, by means of a link $h^4$, with a sliding piece $t^4$, that carries the bar $T'$, while the other two arms of the lever that carry antifriction-rollers $r^4$ $r^4$ are moved by the cams $S^4$ $s^4$ on the shaft $W'$.

The movement of the lower bar $T'$ begins as soon as the lifting-bars $G'$ have raised the lower lugs $n$ of the picker-plates $B'$ lifted by them above the upper edge of this bar $T'$. In consequence of this movement the upwardly-directed rear flange of this bar can be brought under the lugs of the raised picker-plates and prevents these from falling, so that they can now be brought out of the path of the lifting-bars $G'$. The lower bar $T'$ remains in this position until the lifting-bars $G'$ have moved down so far as to allow no contact to take place between them and the plates $B'$, whereupon the bar $T'$ continues to move forward and brings the carriages $A'$, which are moved by it, through the medium of the corresponding plates and pickers $P'$, into the path of the roller $R'$, which now begins to rotate rearwardly and engages with its teeth in the tooth-spaces of the arcs of the carriages, and thus engages with the carriages and moves them along.

The pause in the motion of the lower bar $T'$ during the descent of the lifting-bar is necessary, because otherwise the projections $g$ of the lifting-bar would collide with the projections $a$ of the plates which have not been raised, but which have been moved forward.

In order that all the raised plates shall move back with certainty into their lower position when they are released, there is provided for each class of plates a bar $Q'$ or $Q^2$ $Q^3$, Fig. 3, which is moved down at the proper time. These three bars receive their motion in common and are for this purpose connected to forked suspension-arms $i$, which are pivoted to levers $H^5$, (provided with antifriction-rollers $r^5$,) mounted loose and rotatable on the shaft $W^5$ and actuated by cams $S^5$, (on shaft $W^6$.) These levers are guided by means of links $h^5$, pivoted to the uprights $F'$ and $F^5$.

For the purpose of holding back a carriage $A^3$ in the rear comb $C^3$ the plate $B^3$, which is connected to the former, must be raised, by means of the corresponding lifting-bar $G^3$, by the forked lever $I^3$, which is pivoted on the axle $w^6$, and by the cams $J^3$ $j^3$ on shaft $W^6$, Fig. 4, that act upon the rollers $i^3$ $i^3$ of said lever after this lifting-bar has been first set for the stroke by the action of the corresponding jacquard. This raising movement must be such as to bring the lower nose $n$ to the same level as the limbs of the upper stationary bar $T^3$, so that the raised plate is prevented by this bar from moving forward or backward.

For the purpose of moving a carriage $A^3$ out of the rear comb into the middle comb $C^2$ the corresponding plate $B^3$ must not be raised in order that its lug $n$ shall remain between the upwardly-projecting limbs of the lower bar $T^3$, and thus shift the plate forward in the motion of this bar, whereby the connected rear picker $P^3$, and through it the carriage $A^3$, is moved to the middle comb. The procedure of moving the same is similar to that in the case of the front plate $B'$.

The device for moving the bar $T^3$ consists, as shown in Fig. 5, of a three-armed lever $H^7$, the two arms of which, carrying antifriction-rollers $r^7$ $r^7$, are under the influence of the cams $S^7$ $s^7$, mounted on shaft $W^2$, while the third arm of this lever, which is pivoted on the axle $w^2$, is connected, by means of a rod $h^7$, to the slide-piece $t^7$, carried by the bar $T^3$.

The plates $B'$ and $B^3$ must be selected by the jacquard only for bringing the carriages into the middle comb. For bringing them out of the middle comb no selection of these plates by the jacquard is necessary, because carriages can be moved out of the middle comb only into those slots of the outer comb which were already empty at the commencement of the movement of the carriages into the middle comb or which have become vacant by such movement.

When the carriages have been moved into the middle comb, all the front and rear pickers that are not holding carriages in their respective combs are moved toward the middle ready for the reception of the carriages that are to be transferred to them from the middle comb. On the exit of the carriages out of the middle comb all these pickers are moved back at the proper moment into their original position, since the bars $T'$ $T^3$ moved by cams so timed as to complete the reciprocation of these at this time. Consequently all the carriages coming from the middle comb are engaged by pickers and are moved into the outer combs.

As soon as the outer pickers $P'$ and $P^3$, which are moved to the middle comb, have brought the rearmost or foremost tooth of the carriages $A^2$ into the tooth-spaces of the roller $R'$ or $R^2$ the latter begin to rotate inwardly, so that the carriages engaged by them after they have been released by the downwardly-rotated pickers $P'$ $P^3$ are moved only by the rollers $R'$ $R^2$ without the help of the middle pickers $P^2$ into the middle comb and in the middle position in said comb. In this position, which is shown in Fig. 2, for example, in the case of the carriage $A^2$, the carriages are held by both rollers until the middle pickers have entered the tooth-spaces of the carriage-arcs, whereupon the lifting-bars $G^2$ of the middle pickers raise the plates $B^2$ of those carriages which are to be moved out of the middle comb into the rear comb in such a manner that their upper lugs $n$ move in between the flanges of the upper bar $T^{22}$. The plates $B^2$, which are not raised by the lifting-bars $G^2$, are situated with their lower lugs $n$ between the upwardly-projecting flanges of the lower bar $T^2$ and are therefore moved forward by the latter in its movement. The movement is transmitted to this lower bar $T^2$ from the cams $S^8$ $s^8$, mounted on the shaft $W^8$, by means of a three-armed lever $H^8$, Fig. 3, which is loose on the axle $w^8$ and is provided on the two arms with antifriction-rollers $r^8$ $r^8$, which are acted on by the cams, whereas the third arm of the lever is connected, by means of a rod $h^8$, to the slide-piece $t^8$, carried by the bar $T^2$.

As soon as the lifting-bars have moved into their upper position the lower bar $T^2$ commences a forward movement, and its upper forward-projecting flange moves at once under the lugs $n$ of the raised plates $B^2$, and now a pause occurs in the movement, which continues until the lifting-bars $G^2$ have moved back completely from the plates $B^2$. Then the bar $T^2$ continues its movement, and at the same time the rear roller $R^2$ begins to rotate outwardly—that is to say, in the opposite direction to its previous rotation. By this means the roller $R^2$ engages the carriages $A^2$, which have been pushed back by the plates $B^2$, that were not raised, and it moves these carriages when they have been released by the middle picker $P^2$ in consequence of its downward rotation alone rearward until the rearmost tooth-space of the carriage-teeth has come over the rear pickers $P^3$, which are still set for the middle comb. Then these pickers are caused by their outward movement, which now begins, to engage with the spaces of the carriage-arc teeth and to move the carriages $A^2$, which have been released by the rear roller $R^2$, into the rear comb $C^3$.

Immediately after the rear roller $R^2$ has begun its outward rotation the upper bar $T^{22}$ commences to move back, being acted upon by the cams $S^9$ $s^9$, which act upon the three-armed lever $H^9$, that is fixed, by means of a rod $h^9$, to the slide-piece $t^9$, which is carried by the upper bar $T^{22}$. Upon these cams, which are keyed on the shaft $W^8$, there bears the lever which is pivoted on the axle $w^8$ by means of antifriction-rollers $r^9$ $r^9$, Fig. 6. At the same time as the upper bar $T^{22}$ moves back the front roller $R'$ begins its forward rotation for the purpose of moving into its initial position. By the movement of the upper bar $T^{22}$ the raised plates $B^2$ are pulled backward, and the carriages moved by them are moved forward until they come in the path of the forward roller $R'$, that conveys them to the front pickers $P'$, which are set for the middle comb $C^2$ and which then move these carriages into the front comb. The two bars $T^2$ $T^{22}$ become stationary for a certain period after the middle pickers $P^2$ have rotated downward so far as to move out of the spaces of the carriage-teeth. This latter movement is effected very quickly, because the bar $L^2$, which carries the pivot $d^2$ of the middle pickers, is moved down very quickly into its lower position, this being effected by means of the three-armed lever $H^3$ and of the cams $S^3$ $s^3$, Fig. 3, keyed on the shaft $W^3$.

As soon as the carriages have been moved completely over the middle pickers $P^2$ the two bars $T^2$ $T^{22}$, and consequently also the middle pickers $P^2$, return into their initial position. Therefore the plates $B^2$, which are kept raised by the upper bar $T^{22}$, are able to fall, and any plates which have not fallen are pressed down into the lower position by the bar $Q^2$, Fig. 3, that is moved down at the same time.

Of the three classes of needles which are provided in this machine the front and rear dividing-needles $N'$ and $N^2$ have the function of dividing—$i.$ $e.$, moving apart one from the other—the threads of the carriages and adjusting them properly for the entrance of the lifting-needles $N^3$. The lifting-needles hold the thread-loops (thread-crossings) in the proper positions until they have been fastened in these positions by further thread-loops following and adjacent to them. These three classes of needles are carried, respectively, by the needle-bars $D'$ $D^2$ $D^3$, Figs. 5, 7, and 8. The front dividing-needles $N'$ have an up-and-down movement and also a back-and-forth movement, and as these two movements take place at the same time the point of each dividing-needle $N'$ moves up and down in an arc-shaped path. This movement is produced by three different cams on account of the positions which the needle-bar D' and its needles N' must assume in this operation, the said cams acting by means of levers upon the needle-bar D', which is adapted to swing on two different axes of rotation. Each of these two axes is formed by a pair of pivot-pins $b'$ $b'$ and $b^2$ $b^2$, Figs. 4 and 5, which are mounted in guide-pieces $c$. Each pin $b'$ is engaged, as shown in Fig. 4, by a rod $c'$, which is connected at one end to a bell-crank $H^{10}$, pivoted on the axle $w^5$. The arms of this bell-crank carry antifriction-rollers $r^{10}$ $r^{10}$, which are acted upon by cams $S^{10}$ $s^{10}$, keyed on a shaft $W^5$. The rod $c'$ is connected at its other end by a link $h^{10}$ to a three-armed lever $H^{11}$, pivoted on the axle $w'$. The arms of this lever carrying antifriction-rollers $r^{11}$ $r^{11}$ are acted upon by cams $S^{11}$ $s^{11}$, mounted on the shaft $W^3$. The pin $b'$ is moved backward and forward by the movement of the lever $H^{11}$ and is moved upward and downward by the movement of the lever $H^{10}$. These movements of the pins $b'$ are transmitted by the rods $c$ to the pins $b^2$ and the needles N'. Each of the pins $b^2$ is connected, by means of a rod $c^2$, to a bell-crank $H^{12}$, Fig. 5, that is pivoted on the axle $w^5$ and is moved up and down by the action of a cam $S^{12}$ on an antifriction-roller $r^{12}$ on this bell-crank, the like movement being imparted to the rods $c$ and to the needle-bar D', together with the needles N', carried by said guide-rods. The needles N' are therefore moved by the lever $H^{10}$ and by the lever $H^{12}$ at the same time during their vertical travel. The rear dividing-needles $N^2$, which consist of thin plates formed with points at their lower ends, have only a lateral movement—i.e., in the direction of the length of the machine—and their points are so set that they first enter between the threads of the carriages which have been moved out of the front comb into the middle comb, so that the said plates enter between the threads only on the further backward motion of these carriages. The said lateral movement must take place at the same time as and in coincidence with the movement of the rear comb and is therefore conveniently derived from the latter. For this purpose there is provided, as shown in Figs. 4 and 5, a bell-crank $H^{13}$, mounted loosely on the axle W, one arm of which carries the needle-bar $D^2$, with the needles $N^2$, while the other arm is fixed to the comb-bar $M^3$, that carries the rear comb. The lifting-needles $N^3$, which are all fixed to a single needle-bar $D^3$, Figs. 7 and 8, have to make a twofold movement—namely, a back-and-forth movement and an up-and-down movement. Both movements take place in part simultaneously, so that the lifting-needles $N^3$ receive an arc-shaped movement. The needle-bar is moved back and forth by means of the cam $S^{14}$ and the lever $H^{14}$, which rocks on the axle $w^5$, Fig. 7, and has an antifriction-roller $r^{14}$, upon which this cam acts, whereby by means of the rod $h^{14}$ the arm $c^3$, which carries the needle-bar, is caused to rock. By raising and lowering this arm $c^3$ by means of the bell-crank $H^{15}$, Fig. 8, which is operated by the cams $S^{15}$ $s^{15}$ and carries the antifriction-rollers $r^{15}$ $r^{15}$ and is mounted on the shaft $W^6$, the needle-bar $D^3$ receives its up-and-down motion. The entrance of the needle will take place with certainty only when the crossed threads are drawn tight at the moment of the entrance of the needle, as indicated by the dotted lines $f$ $f'$ in Figs. 9 and 10; otherwise there is no determined crossing-place for the threads, and, in fact, the crossing-point $k$ may occur in the most varied positions relatively to the needles, as is shown, for example, in full lines in Figs. 9 and 10, where the needle $N^3$ can enter between the threads at the side of or above the crossing-place, and therefore cannot raise the thread-crossing.

Figures 9, 10, 11:
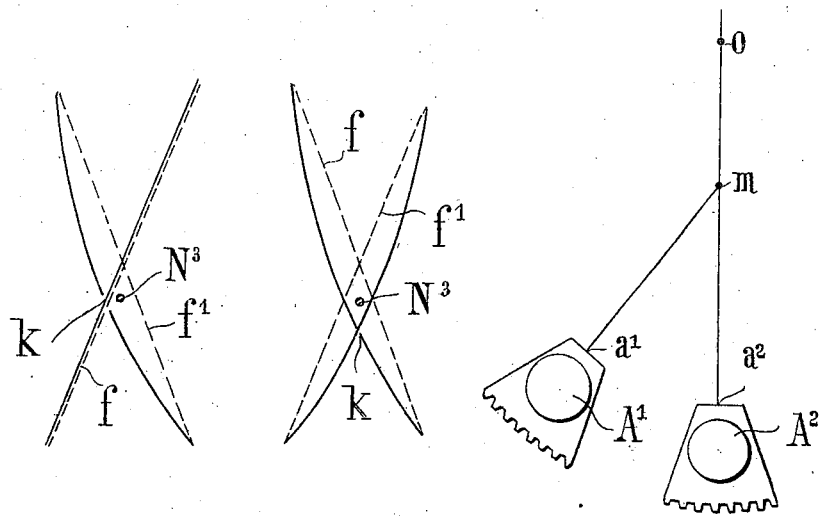
Figures 12, 13, 14, 15:
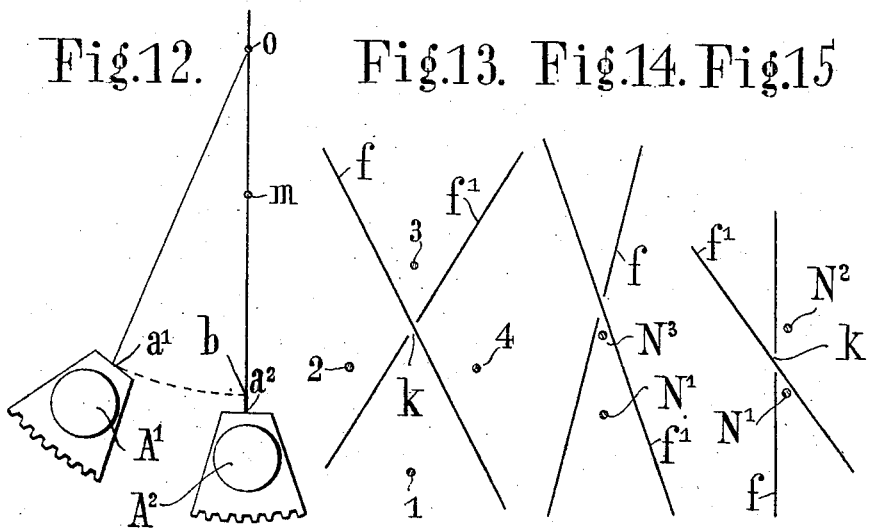

In order that the threads which are to be looped or twisted together shall always be drawn tight during the passage of the carriages from the front comb (position A') into the middle comb, (position $A^2$, Fig. 11,) the carriage-thread, which is held fast at the point $o$, must always pass through the center $m$ of the arc-shaped path of the carriages, (this center corresponding to the center of the shaft $w$,) because then this movement of the carriages will not cause any alteration in the tension of the threads, as the portions of thread $o$ $m$ $a'$ and $o$ $m$ $a^2$, Fig. 11, are of the same length. If in this movement the carriage-thread were not compelled to pass through the center of rotation $m$ of the carriages, as shown in Fig. 12, it would lose its tension during this travel of the carriages from $A^2$ to A', because the portion of thread $o$ $a'$ would then be shorter by the length $a^2$ $b$ than the portion $o$ $a^2$. Consequently in order to keep the threads drawn tight a corresponding shortening of the carriage-thread would have to take place during this motion of the carriages; but as this is impossible, therefore the thread must be compelled to pass constantly through the axis of motion $m$ of the carriages. This is effected in the improved machine by means of bars Z' $Z^2$, Figs. 3 to 5, the lower edges of which are situated directly above the point $m$, (center of the shaft $w$)—namely, one lower edge close in front of and the other lower edge close behind this point. If, therefore, the threads are led between these two edges to the winding-up beam O, this condition is fulfilled.

In Fig. 13, $f$ and $f'$ indicate two threads which cross at $k$, and 1 2 3 4 indicate different positions of a lifting-needle $N^3$ with relation to the crossing of the threads. As will be seen, only the lifting-needle which is situated in the position 1—that is to say, which has entered with its point between the threads below the crossing-point $k$—will be able to lift the thread-crossing with certainty.

The entrance of the front dividing-needle N' between the crossed threads takes place in the same manner as in the well-known "twist-lace" machines—namely, directly above the upper edge of the carriages. These needles therefore enter at all times properly between the threads.

In the heretofore-known pillow-lace machines the lifting-needles $N^3$ enter between the threads above the front dividing-needles N', as shown in Fig. 14. This has the result when one of the two crossed threads is sharply inclined, as shown in Fig. 15, that the crossing-point $k$ shifts down to the front dividing-needle N', so that the lifting-needle $N^3$ enters between the threads above and sidewise of the crossing-place, and therefore can neither lift nor hold fast the thread-crossing.

Now in the improved machine the entrance of the lifting-needle between the threads takes place below the front dividing-needle, so that, as will be seen from Figs. 14 and 15, it is impossible for the lifting-needle to enter above the crossing-place.

Fig. 27 shows the course of the carriage-threads to the winding-up or goods beam O. The conditions necessary for the proper insertion of the needles are that the threads shall be tightly stretched, and this will only be the case when these threads pass through the center of motion $m$ of the carriages, they being forced to pass through this point by the beams or temples Z' and $Z^2$, and, as will be seen from said figure, this center is the point at which the threads are crossed or the twist formed and is held fast by the lifting-needles $N^3$. All of the crossings are held at this point to fulfil the conditions above named whether another twist immediately follows or not. Another condition for the proper insertion of the lifting-needles is that they shall be inserted under the dividing-needle N' between the already-crossed threads.

Fig. 28 shows two crossed threads held by a lifting-needle $N^3$ and a second crossing with a dividing-needle N' inserted and moved to position directly under the lifting-needle. Now in order to lift this second crossing into the line or center of movement $m$ of the carriages this needle $N^3$ must be withdrawn, and after the dividing-needle N' has moved into the position formerly held by the lifting-needle said needle $N^3$ must be inserted below N'. The dividing-needle N' therefore holds the first as well as the second crossing in position until the lifting-needle $N^3$ is inserted, as can be seen from Fig. 28.

Fig. 29 shows that if two threads do not form a new crossing after several movements the last-made crossing is still held and cannot slip down, notwithstanding repeated withdrawals and insertions of the needle $N^3$. Since all the dividing-needles N' are secured to a single bar D' and all the lifting-needles $N^3$ to a single bar $D^3$, the movements of all the needles on a bar are simultaneous and equal, being imparted by the mechanisms shown in Figs. 4, 5, 7, and 8.

In Fig. 30 the needles N', $N^2$, and $N^3$ being in the same vertical plane, the front carriage-thread $f'$ being to the left and the rear carriage-thread $f^2$ to the right of this plane, it will be seen from the figure that the thread $f'$ is behind the front needle N' and the thread $f^2$ in front of needle $N^2$, while the needle $N^3$ is holding a twist already formed. Fig. 30 also shows the parts in that position when the carriages are about to begin their movement that is to carry the threads $f'$ and $f^2$ through the center of motion $m$ of the carriages, being compelled to cross at this point by the temples Z' and $Z^2$. The needle N' then continues its movement until its point is directly in front of the needle $N^2$, Fig. 31, and passes the rear thread $f^2$ to the left, said thread being held by needle $N^2$ to take its place under the crossing already made to lift this crossing up under the one held by needle $N^3$, whereupon the needle $N^3$ is withdrawn and inserted under needle N', Fig. 32. It will thus be seen that it requires the coöperation of the several needles with the temples and carriage-threads to insure the proper insertion of the needles.

Figs. 33 and 34 show the path of the needles N' and $N^3$ in dotted lines, the points marked 1 on said dotted lines corresponding to the positions of the ends of said needles in Fig. 27.

As soon as the front dividing-needle N' has moved over the upper edge of the rear dividing-needle $N^2$ the lifting-needle is withdrawn from the threads and is set backward to such an extent that its point can move below that of the front dividing-needle, whereupon it is pushed forward directly under the latter, and therefore enters with complete certainty below the thread-crossing which was lifted by the front dividing-needle.

The greater number of machines constructed according to the present invention will need to be provided only with lifting-needles which are guided or carried by one needle-bar, and this will be sufficient in all cases where it is desired to make lace in which it is possible to design the formation and the successive addition of the crossing-points of the threads in such a manner that the said successive addition shall take place only in a downward direction and not in an upward direction.

I claim—

1. In a lace-making machine, the combination with thread-carriages, lifting and dividing needles; of a pair of temples whose lower edges are substantially in the center of motion of the carriages, and between which the finished lace passes as it is formed.

2. In a lace-making machine, the combination with thread-carriages, lifting and dividing needles; of a pair of wedge-shaped temples whose lower edges are substantially in the center of motion of the carriages and between which the finished lace passes as it is formed.

3. In a lace-making machine, the combination with thread-carriages, lifting and dividing needles; of a pair of fixed wedge-shaped temples whose lower edges are substantially in the center of rotation of the carriages and between which the finished lace passes as it is formed.

4. In a lace-making machine, the combination with a pair of temples whose active edges are substantially in the center of motion of the carriages; of three sets of coöperating needles below the temples, substantially as described.

5. In a lace-making machine, the combination with three combs; of a transfer-roller at the front and at the back of the center comb.

6. In a lace-making machine, the combination with three sets of combs and carriages; of an oscillating roller at the front and at the back of the middle comb positioned to engage and move carriages to and from the middle comb and temporarily hold them between the two rollers in the middle comb, substantially as described.

7. In a lace-making machine, the combination with one of its combs and carriages movable into and out of the same; of a set of pickers and means to bodily move them into and out of operative relation to the carriages, substantially as described.

8. In a lace-making machine, the combination with a set of front and a set of rear dividing-needles; of a set of lifting-needles simultaneously movable into and out of operative position.

9. In a lace-making machine, the combination with a front needle-bar and dividing-needles thereon, and a rear bar and dividing-needles thereon; of lifting-needles and a bar to which the last are secured, substantially as described.

10. In a lace-making machine, the combination with three combs and carriages; of a rear needle-bar and dividing-needles whose points are positioned to pass between the carriage-threads before they leave the center comb, substantially as described.

11. In a lace-making machine, the combination with three combs and carriages; of a laterally-movable rear needle-bar and dividing-needles secured thereto whose points are positioned to pass between the carriage-threads before they leave the center comb, substantially as described.

12. In a lace-making machine, the combination with three combs, carriages therein and a pair of temples whose active edges are substantially in the center of motion of the carriages; of a set of front dividing-needles, a bar carrying the same, a set of rear dividing-needles, a laterally-movable bar carrying the same, a set of lifting-needles and a bar carrying the same, all of said needles movable below the temples, substantially as described.

13. In a lace-making machine, the combination with three combs, carriages therein; of a set of rear dividing-needles, a bar to which said needles are secured, and means to simultaneously move the rear comb and needle-bar longitudinally, substantially as described.

14. In a lace-making machine, the combination with a comb and carriages; of oscillating rollers to transfer the carriages to and from the comb and hold carriages between them at the end of one of their movements, pickers normally out of engagement with the carriages and mechanism to bodily move all of the pickers into engagement with the carriages while they are held by the rollers, substantially as described.

15. In a lace-making machine, the combination with a set of front dividing-needles to enter between crossed carriage-threads; of a set of lifting-needles timed to enter the crossed carriage-threads below the dividing-needles, and before their withdrawal to lift the thread-crossing to the center of motion, substantially as described.

16. In a lace-making machine, the combination with the combs and carriages; of a set of simultaneously-movable front dividing-needles, a set of laterally-movable rear dividing-needles, mechanism to move the front dividing-needles to enter between the carriage-threads of the carriages in the front comb and move over close to the oppositely-situated rear dividing-needles, lifting-needles, mechanism to withdraw the same from a thread-crossing, reinsert them under the front lifting-needles and lift the crossing held by the latter needles to and hold it in the proper position while the said dividing-needles are being returned by their operative mechanism for a new insertion, substantially as described.

17. In a lace-making machine, the combination with a comb and carriages; of a set of pickers, mechanism to bodily move the pickers simultaneously into operative relation to the carriages, and jacquard-controlled mechanism to selectively rotate the pickers, substantially as described.

18. In a lace-making machine, the combination with three combs and a set of pickers for each comb; of blades operatively connected to the pickers, jacquard-controlled mechanism to selectively lift the blades, means to reciprocate the blades and means near the connection of the blades and pickers to cause the blades to partially rotate about said connection during the lifting of the blades and thereby prevent the movement of the pickers while the blades are being acted upon by the lifting-bars, substantially as described.

19. In a lace-making machine, the combination with a stationary and two movable combs and carriages; of a set of pickers for each comb, an oscillating roller in front of and back of the stationary comb, fixed temples whose active edges are substantially in the center of motion of the carriages, a set of front and a set of rear dividing-needles, a set of lifting-needles operated to be inserted below the front dividing-needles, blades connected to the pickers, a group of jacquard-controlled lifting-bars for each set of blades, cam-operated mechanism to move each group of lifting-bars to and from their respective set of blades, and an upper and a lower transverse bar near the connection of the pickers and their blades to induce the blades to partially rotate around the same when moved by the lifting-bars, substantially as described.

20. In a lace-making machine, the combination with three combs and the thread-bars, of pickers for each comb, three jacquard mechanisms, one to selectively control all the pickers for a comb, and a jacquard mechanism to control the thread-bars, substantially as described.

21. In a lace-making machine, the combination with the thread-bars and a jacquard for operating them, of three combs, pickers for each comb and a jacquard mechanism to selectively control the pickers of each comb, mechanism to longitudinally move two of the combs.

22. In a lace-making machine, the combination with three combs, a set of pickers for each comb, means to move two of the combs longitudinally, a set of pickers for each comb and means to move two of the sets with their respective combs, and means to move the other set bodily in the comb-slots and at right angles to the length of the comb, substantially as described.

23. In a lace-making machine, the combination with a fixed comb and two movable combs, of a set of pickers for each comb, jacquard-controlled picker-blades for each set of pickers, lugs on the blades, and two channel-shaped bars to engage the lugs of each set of pickers, substantially as described.

24. In a lace-making machine, the combination with a fixed comb and two movable combs, of a set of rotatable pickers for each comb, jacquard-controlled picker-blades for each set of pickers, oppositely-situated lugs on each picker-blade, a fixed and a movable channel-shaped bar to engage lugs on the blades, actuating-pickers for two of the combs, the movable bar imparting movement to those blades and pickers that are to be moved, and two movable channel-shaped bars that engage the lugs of the blades controlling the pickers for the third comb, substantially as described.

In testimony that I claim the foregoing as my invention I have signed my name in presence of two subscribing witnesses.

AUGUST MATITSCH.

Witnesses:
JOSEF RUBARCH,
ALVESTO S. HOGUE.